United States Patent
Torii et al.

(10) Patent No.: US 9,043,672 B2
(45) Date of Patent: May 26, 2015

(54) MEMORY CONTROLLER, STORAGE DEVICE, AND MEMORY CONTROL METHOD

(71) Applicant: Kabushiki Kaisha Toshiba, Minato-ku (JP)

(72) Inventors: Osamu Torii, Tokyo (JP); Riki Suzuki, Kanagawa (JP); Ryo Yamaki, Kanagawa (JP); Naoaki Kokubun, Kanagawa (JP); Daisuke Miyashita, Kanagawa (JP); Kohei Oikawa, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 113 days.

(21) Appl. No.: 14/017,809

(22) Filed: Sep. 4, 2013

(65) Prior Publication Data

US 2014/0245103 A1    Aug. 28, 2014

Related U.S. Application Data (60) Provisional application No. 61/770,111, filed on Feb. 27, 2013.

(51) Int. Cl.
*H03M 13/00* (2006.01)
*G06F 11/10* (2006.01)

(52) U.S. Cl.
CPC ................. *G06F 11/1068* (2013.01)

(58) Field of Classification Search
CPC . G06F 11/1008; G06F 11/1068; G11B 20/08; G11B 20/14

USPC ............................ 370/536; 714/755, 769, 758
See application file for complete search history.

(56) References Cited

U.S. PATENT DOCUMENTS

| | | | |
|---|---|---|---|
| 6,263,466 B1 * | 7/2001 | Hinedi et al. | 714/755 |
| 6,279,132 B1 * | 8/2001 | Linsky et al. | 714/755 |
| 6,795,947 B1 * | 9/2004 | Siegel et al. | 714/802 |
| 7,929,578 B2 * | 4/2011 | Wei et al. | 370/536 |
| 8,176,234 B2 | 5/2012 | Franceschini et al. | |
| 8,266,495 B2 * | 9/2012 | Yang et al. | 714/755 |
| 8,489,979 B2 * | 7/2013 | Rub | 714/810 |
| 2012/0069681 A1 | 3/2012 | Oikawa | |

FOREIGN PATENT DOCUMENTS

| | | |
|---|---|---|
| JP | 11-213693 | 8/1999 |
| JP | 2001-229073 | 8/2001 |

* cited by examiner

*Primary Examiner* — David Ton
(74) *Attorney, Agent, or Firm* — Oblon, McClelland, Maier & Neustadt, L.L.P.

(57) ABSTRACT

According to one embodiment, a memory controller includes: a first flash encoding unit that performs flash encoding on user data according to a first scheme to generate user data flash codes; an encoding unit that performs an error correction encoding process on the user data flash codes to generate parities; a second flash encoding unit that performs flash encoding on the parities according to a second scheme to generate parity flash codes; and a memory I/F that writes the user data flash codes and the parity flash codes to the nonvolatile memory.

9 Claims, 8 Drawing Sheets

| INFORMATION | VALUES WRITTEN TO CELLS | |
|---|---|---|
| 00 | 111 | 000 |
| 01 | 101 | 010 |
| 10 | 110 | 001 |
| 11 | 011 | 100 |
| | T1 | T2 |

| INFOR-MATION | VALUES WRITTEN TO CELLS |  |  |  |  |  |  |  |  |  |  |  |  |  |  |  |
|---|---|---|---|---|---|---|---|---|---|---|---|---|---|---|---|---|
| 00 | 1 | 0 | 3 | 2 | 1 | 0 | 1 | 0 | 3 | 2 | 3 | 2 | 1 | 0 | 3 | 2 |
|  | 1 | 0 | 1 | 0 | 3 | 2 | 1 | 0 | 3 | 2 | 1 | 0 | 3 | 2 | 3 | 2 |
|  | 1 | 0 | 1 | 0 | 1 | 0 | 3 | 2 | 1 | 0 | 3 | 2 | 3 | 2 | 3 | 2 |
| 01 | 1 | 0 | 3 | 2 | 1 | 0 | 1 | 0 | 3 | 2 | 3 | 2 | 1 | 0 | 3 | 2 |
|  | 0 | 1 | 0 | 1 | 2 | 3 | 0 | 1 | 2 | 3 | 0 | 1 | 2 | 3 | 2 | 3 |
|  | 1 | 0 | 1 | 0 | 1 | 0 | 3 | 2 | 1 | 0 | 3 | 2 | 3 | 2 | 3 | 2 |
| 10 | 1 | 0 | 3 | 2 | 1 | 0 | 1 | 0 | 3 | 2 | 3 | 2 | 1 | 0 | 3 | 2 |
|  | 1 | 0 | 1 | 0 | 3 | 2 | 1 | 0 | 3 | 2 | 1 | 0 | 3 | 2 | 3 | 2 |
|  | 0 | 1 | 0 | 1 | 0 | 1 | 2 | 3 | 0 | 1 | 2 | 3 | 2 | 3 | 2 | 3 |
| 11 | 0 | 1 | 2 | 3 | 0 | 1 | 0 | 1 | 2 | 3 | 2 | 3 | 0 | 1 | 2 | 3 |
|  | 1 | 0 | 1 | 0 | 3 | 2 | 1 | 0 | 3 | 2 | 1 | 0 | 3 | 2 | 3 | 2 |
|  | 1 | 0 | 1 | 0 | 1 | 0 | 3 | 2 | 1 | 0 | 3 | 2 | 3 | 2 | 3 | 2 |

FIG.8

| INFOR-MATION | VALUES WRITTEN TO CELLS | | | | | | | | |
|---|---|---|---|---|---|---|---|---|---|
| 00 | 0000 | 0121 | 0212 | 1022 | 1110 | 1201 | 2011 | 2102 | 2220 |
| 01 | 0001 | 0122 | 0210 | 1020 | 1111 | 1202 | 2012 | 2100 | 2221 |
| 02 | 0002 | 0120 | 0211 | 1021 | 1112 | 1200 | 2010 | 2101 | 2222 |
| 10 | 0010 | 0101 | 0222 | 1002 | 1120 | 1211 | 2021 | 2112 | 2200 |
| 11 | 1000 | 1121 | 1212 | 2022 | 2110 | 2201 | 0011 | 0102 | 0220 |
| 12 | 0100 | 0221 | 0012 | 1122 | 1210 | 1001 | 2111 | 2202 | 2020 |
| 20 | 1100 | 1221 | 1012 | 2122 | 2210 | 2001 | 0111 | 0202 | 0020 |
| 21 | 1010 | 1101 | 1222 | 2002 | 2120 | 2211 | 0021 | 0112 | 0200 |
| 22 | 0110 | 0201 | 0022 | 1102 | 1220 | 1011 | 2121 | 2212 | 2000 |

MEMORY CONTROLLER, STORAGE DEVICE, AND MEMORY CONTROL METHOD

CROSS-REFERENCE TO RELATED APPLICATIONS

This application is based upon and claims the benefit of priority from Provisional Patent Application No. 61/770,111, filed on Feb. 27, 2013; the entire contents of which are incorporated herein by reference.

FIELD

Embodiments described herein relate generally to a memory controller, a storage device, and a memory control method.

BACKGROUND

Flash codes are codes that are under research and development with the aim to improve reliability of flash memories. When data is overwritten to the same page of a flash memory, blocks that include the page are generally erased before the overwriting. Block erasure imposes a heavy load on flash memories and leads to quality deterioration if the frequency of erasures in a flash memory increases. Thus, if it is possible to perform overwriting without performing erasure as much as possible, the frequency of erasures in a flash memory can be decreased, and quality deterioration of a flash memory can be suppressed. Flash codes are codes that enable such overwriting, and various types of flash codes are known.

Flash codes come in two schemes: one scheme expresses multiple bits of data using multiple cells (memory cells of a flash memory) and the other scheme expresses one bit of data using multiple cells.

In this specification, a scheme that expresses $f_1$ bits of data using $f_2$ cells (where $f_1$ and $f_2$ are integers of 2 or more) is referred to as a $f_1:f_2$ scheme, and a scheme that expresses one bit of data using $f_3$ cells (where $f_3$ is an integer of 2 or more) will be referred to as a $1:f_3$ scheme.

DETAILED DESCRIPTION

In general, according to one embodiment, a memory controller includes a first flash encoding unit that performs flash encoding on user data according to a first scheme to generate user data flash codes, an encoding unit that performs an error correction encoding process on the user data flash codes to generate parities, a second flash encoding unit that performs flash encoding on the parities according to a second scheme to generate parity flash codes, and a memory interface that writes the user data flash codes and the parity flash codes to a nonvolatile memory.

Exemplary embodiments of a memory controller, a storage device, a memory control method will be explained below in detail with reference to the accompanying drawings. The present invention is not limited to the following embodiments.

Figure 1:
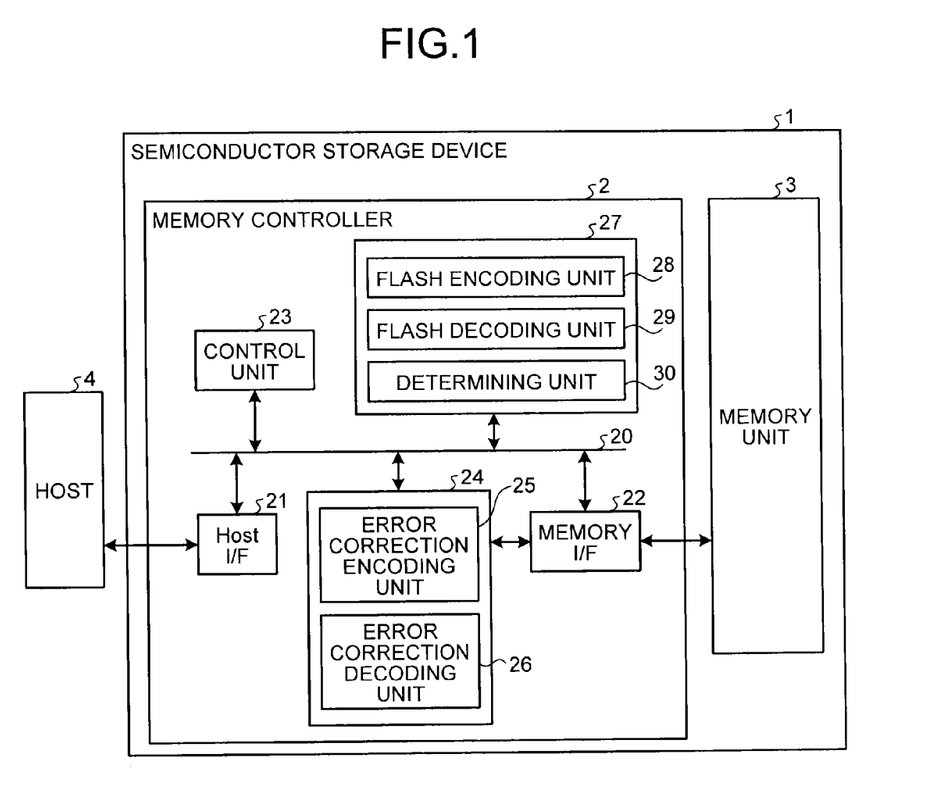
FIG. 1 is a block diagram illustrating a configuration example of a semiconductor storage device according to an embodiment.

FIG. 1 is a block diagram illustrating a configuration example of a semiconductor storage device (storage device) according to an embodiment. A semiconductor storage device 1 of the present embodiment includes a memory controller 2 and a memory unit (nonvolatile memory) 3. The semiconductor storage device 1 can be connected to a host 4, and a state where the semiconductor storage device 1 is connected to the host 4 is illustrated in FIG. 1. The host 4 is an electronic device such as a personal computer or a mobile terminal.

The memory unit 3 is a NAND flash memory (NAND memory) that stores data in a nonvolatile manner. In NAND memories, data is written in units of writing called page and is erased in units of blocks each including at least one page. In the present embodiment, data is flash-encoded and stored in the memory unit 3. NAND memories come in two types: one is a single-level cell memory that stores one bit of data in one memory cell and the other is a multi-level cell memory that stores multiple bits of data in one memory cell, however, the present embodiment can be applied to any of the two types of memories.

The memory controller 2 controls writing of data to the memory unit 3 according to a write command (request) from the host 4 and controls reading of data from the memory unit 3 according to a read command (request) from the host 4. The memory controller 2 includes a Host I/F 21, a memory I/F 22, a control unit 23, an error correction encoding/decoding unit 24, and a flash encoding/decoding unit 27. The error correction encoding/decoding unit 24 includes an error correction encoding unit 25 and an error correction decoding unit 26. The flash encoding/decoding unit 27 includes a flash encoding unit 28, a flash decoding unit 29, and a determining unit 30. The Host I/F 21, the memory I/F 22, the control unit 23, the error correction encoding/decoding unit 24, and the flash encoding/decoding unit 27 are connected by an internal bus 20. The configuration example of FIG. 1 is an example, and the present embodiment is not limited to this. For example, the flash encoding/decoding unit 27 may be included in the control unit 23 and may be included in the error correction encoding/decoding unit 24 or the memory I/F 22.

The Host I/F 21 performs processes according to the interface standard between the Host I/F 21 and the host 4, and outputs commands, user data, and the like received from the host 4 to the internal bus 20. The Host I/F 21 transmits the user data read from the memory unit 3, responses from the control unit 23, and the like to the host 4.

The memory I/F 22 controls a process of writing data to the memory unit 3 and a process of reading data from the memory unit 3 based on an instruction of the control unit 23.

The control unit 23 controls the respective components of the semiconductor storage device 1 in a centralized manner. Upon receiving a command from the host 4 via the Host I/F 21, the control unit 23 performs control according to the command. For example, according to a command from the host 4, the control unit 23 instructs the memory I/F 22 to perform processes such as writing of user data and parities to the memory unit 3 and reading of user data and parities from the memory unit 3.

The error correction encoding unit 25 performs an error correction encoding process based on the flash-encoded user data (hereinafter, referred to as user data flash codes) transmitted to the internal bus 20 to generate parities. Any codes may be used as the error correction codes, for example, BCH codes, Reed-Solomon (RS) codes, and the like can be used. The type of error correction codes is not limited to this, and it is preferable to use codes which can be classified into information data (user data) and parities after the codes are encoded.

The error correction decoding unit 26 performs a decoding process based on the user data flash codes read from the memory unit 3 and the parities decoded by the flash decoding unit 29. When the user data flash codes do not have errors, the user data flash codes read from the memory unit 3 are output to the internal bus 20 as they are. When the user data flash codes have errors, error correction is performed using parities, and the error-corrected user data flash codes are output to the internal bus 20.

The flash encoding unit 28 performs a flash encoding process on data (information) to be written to the memory unit 3 and the parities generated by the error correction encoding unit 25 and outputs processed codes to the internal bus 20.

The flash decoding unit 29 decodes parity flash codes (flash-encoded parities) among the flash codes read from the memory unit 3 in reverse order from the flash encoding and outputs parities which are decoding results to the internal bus 20. The flash decoding unit 29 decodes the error-corrected user data flash codes in reverse order from the flash encoding and outputs user data which is decoding results to the internal bus 20.

Here, flash codes will be described. Flash codes are codes for reducing the number of erasures by allowing overwriting. In flash memories such as NAND memories, multiple levels corresponding to a cell charge state are present. In general, information is stored in a flash memory by correlating information to be stored in a cell with the level of the cell in one-to-one correspondence. Flash encoding is a process of converting information into flash codes.

Figure 2:
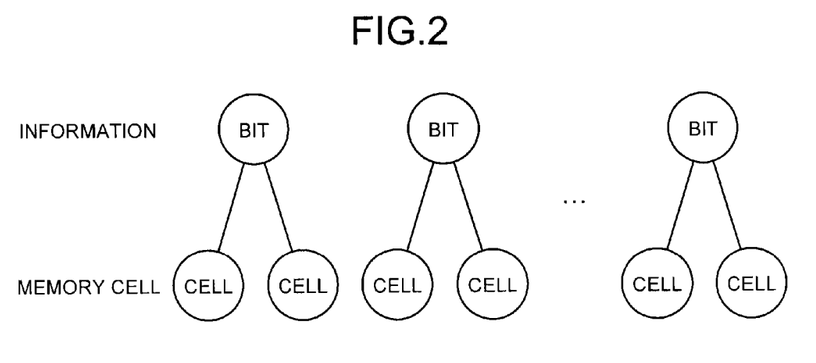
FIG. 2 is a diagram illustrating the concept of a $1:f_3$ scheme.
Figure 3:
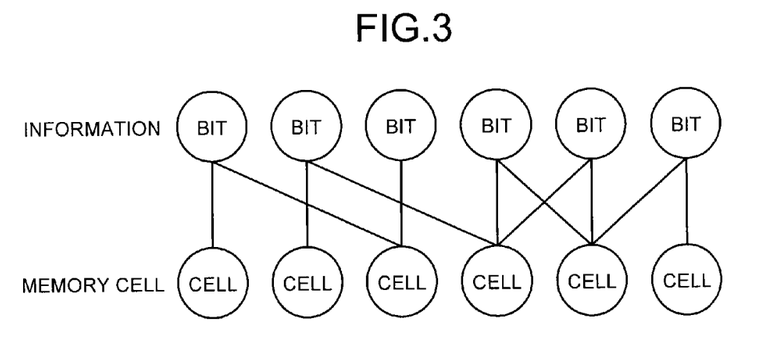
FIG. 3 is a diagram illustrating the concept of a $f_1:f_2$ scheme.

Flash codes come in two schemes: one is a $f_1:f_2$ scheme (where $f_1$ and $f_2$ are integers of 2 or more) in which multiple bits of information are expressed using multiple cells, and the other is a $1:f_3$ scheme (where $f_3$ is an integer of 2 or more) in which one bit of information is expressed using multiple cells (for example, enumerative coding or the like disclosed in U.S. Pat. No. 8,176,234). FIG. 2 is a diagram illustrating the concept of the $1:f_3$ scheme. FIG. 3 is a diagram illustrating the concept of the $f_1:f_2$ scheme.

Figure 4:
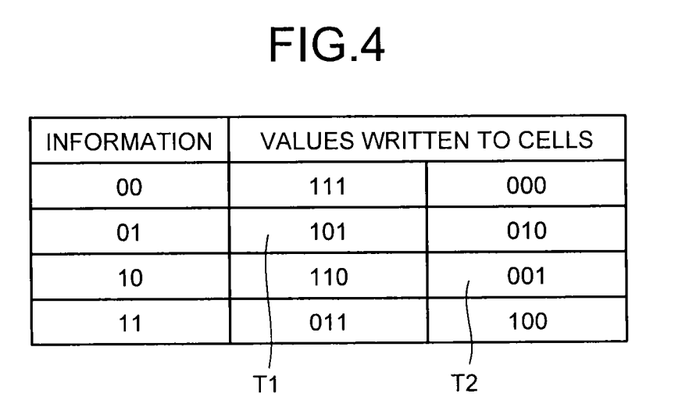
FIG. 4 is a diagram illustrating an example of correspondence between information and values written to cells.

In flash encoding, values (corresponding to cell levels) to be written to a cell are encoded based on a bit value of information. FIG. 4 is a diagram illustrating an example of correspondence between information and values written to a cell. FIG. 4 illustrates an application example of a scheme where two bits of information are written to three cells when single-level cells are used, that is, the $f_1:f_2$ scheme where $f_1=2$ and $f_2=3$. It is assumed that, when the two levels of single-level cells are level #0 and level #1, level #0 and level #1 correspond to the values 0 and 1 to be written to a cell. When the three cells for expressing two bits of information are first to third cells, the values of the three bits to be written to the first to third cells are illustrated on the right side of FIG. 4. For example, "111" represents that "1" is written to the first to third cells (the first to third cells are put into level #1). In this example, each cell is in level #1 (that is, "1" is written) in an initial state (no writing has been performed). In order to allow the cells having level #0 due to writing to return to level #1, erasing is required.

For example, a case where "01" is written as information by the initial writing, and then the information is rewritten to "10" will be considered. When flash codes are not used, rewriting is carried out in the following steps using two cells.

(a) "01" is written to a cell.
(b) The cell is put into "11" by erasing.
(c) "10" is written to the cell.

On the other hand, flash codes illustrated in FIG. 4 are used, the same rewriting can be carried out without performing erasing according to the following steps.

(1) "101" containing a larger number of "1s" (that is, highly likely to be rewritten later) among the values "101" and "010" to be written to a cell corresponding to information "01" is selected (T1 in FIG. 4), and "0" is written to the second cell (the first and third cells remain in "1").

(2) "001" that can be changed from the state "101" among the values "110" and "001" to be written to a cell corresponding to information "10" is selected (T2 in FIG. 4), and "0" is written to the first cell (the third cell remains in "1").

Figure 5:
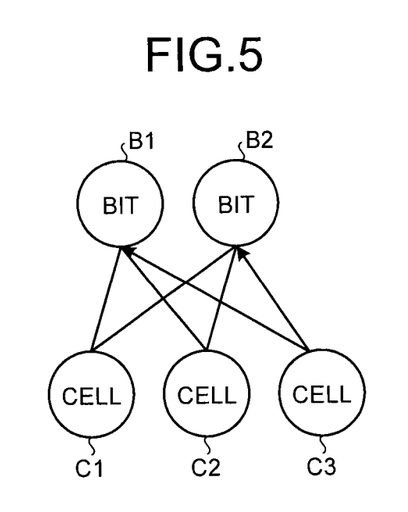
FIG. 5 is a diagram illustrating an example of error propagation.

In this manner, by using flash codes, information can be rewritten without performing erasure. On the other hand, in the $f_1:f_2$ scheme, an error occurring in one cell propagates to multiple bits of information. FIG. 5 is a diagram illustrating an example of error propagation. As illustrated in FIG. 5, it is assumed that the two bits of information are bit B1 and bit B2, and the two bits of information are written using the three cells of first to third cells (C1 to C3 in FIG. 5). For example, in step (1) above, when an error occurs in the third cell (C3) after "101" is written to the cells, the value stored in the cells becomes "100". When decoding is performed based on "100", the decoded information is "10" and one bit error in the cell propagates to two bits B1 and B2.

On the other hand, in the $1:f_3$ scheme illustrated in FIG. 2, when data is decoded from a cell state, a propagation range of one bit error in one cell is one bit only. On the other hand, since multiple cells are required to express just one bit, there is a problem in that the volume of data that can be stored in a flash memory decreases.

In the present embodiment, by taking advantage of the respective schemes of flash codes, user data is written to the memory unit 3 using the $f_1:f_2$ scheme and parities are written to the memory unit 3 using the $1:f_3$ scheme. As a result, an error having occurred in a cell can be prevented from propagating to a large number of bits while suppressing a decrease in the volume of data that can be stored in the memory unit 3.

Figure 6:
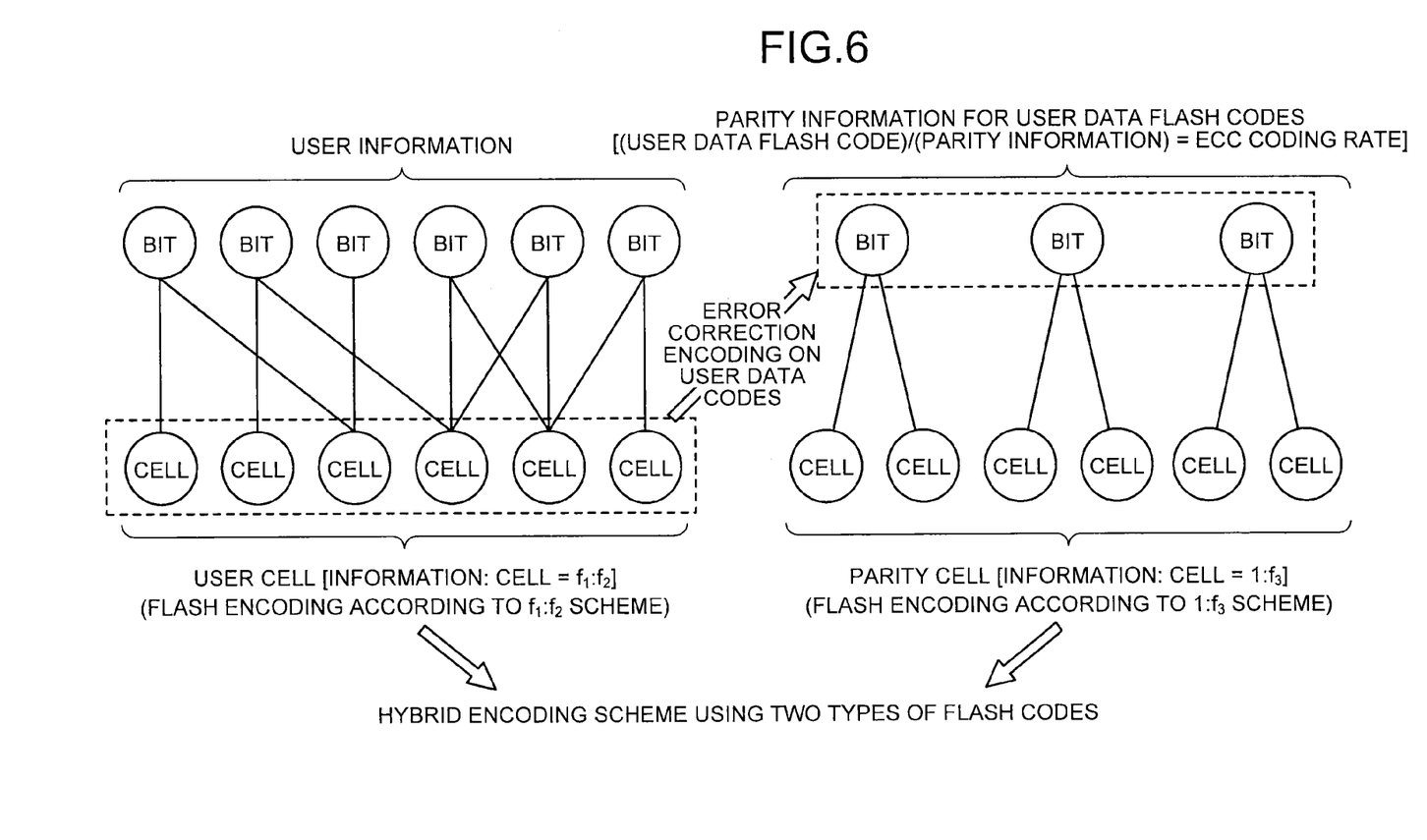
FIG. 6 is a diagram illustrating an example of flash encoding schemes according to an embodiment.

FIG. 6 is a diagram illustrating an example of flash encoding schemes according to the present embodiment. In the present embodiment, as illustrated in FIG. 6, memory cells of the memory unit 3 are classified into user cells for user data and parity cells for parities. User data (information data) is flash-encoded according to the $f_1:f_2$ scheme and is stored in the user cells. Parities are generated based on the flash-encoded user data (user data flash codes) according to error correction encoding. The parities are flash-encoded according to the $1:f_3$ scheme and are stored in the parity cells.

In this manner, since the 1:$f_3$ scheme is used for parities, decoding (decoding of flash codes) can be performed while preventing an error in a cell from propagating to multiple bits of the information. Further, even if the $f_1$:$f_2$ scheme is used for user data, since errors can be corrected in the state (that is, values written to a cell) of user data flash codes, and cells do not have errors, it is possible to prevent errors from propagating to information.

Although an arrangement of the user data cells and the parity cells on the memory unit 3 is not particularly limited, the user data cells and the parity cells may be arranged on the same block, for example. In this case, since parities corresponding to the user data stored in the user data cells are stored in the same block, management is easy. In the following description, although it is assumed that the user data cells and the parity cells are arranged in the same block, the arrangement is not limited to this, and the user data cells and the parity cells may be arranged in different blocks.

Next, flash encoding according to the present embodiment will be described. In the present embodiment, as described above, both the $f_1$:$f_2$ scheme and the 1:$f_3$ scheme are used. Specific flash encoding methods of the respective schemes are not particularly limited, and encoding methods are optional. In the example of FIG. 4, although the example of single-level cells is described for the simplicity's sake, multi-level cells are generally used in many cases.

Figure 7:
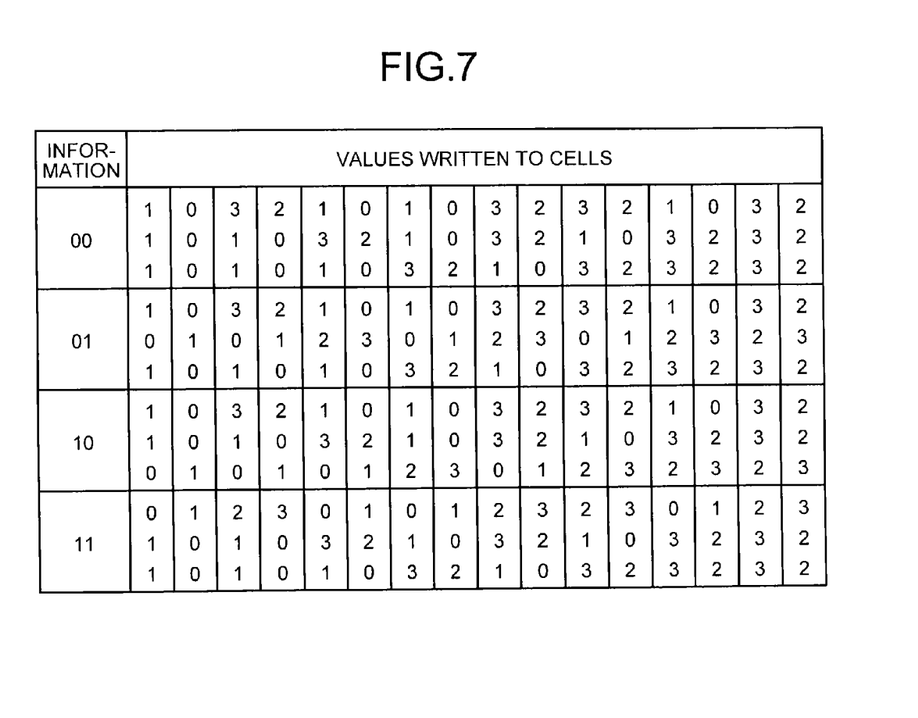
FIG. 7 is a diagram illustrating an example of 2:3-scheme flash codes when one cell can store four values.
Figure 8:
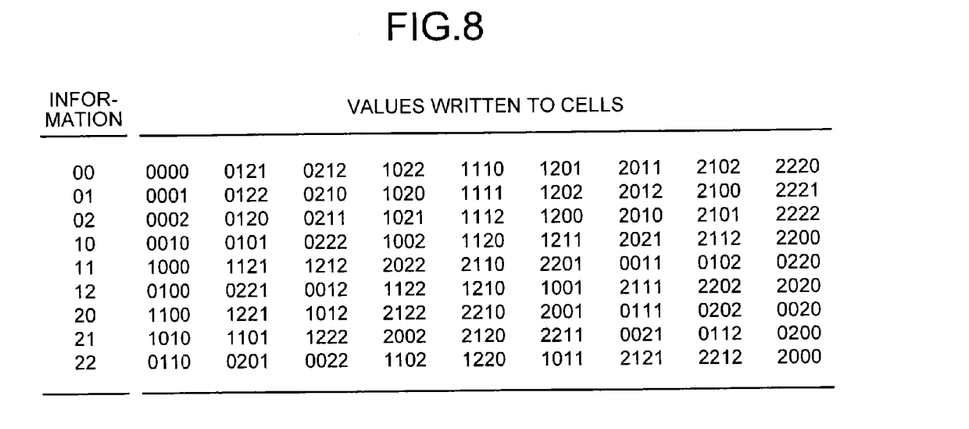
FIG. 8 is a diagram illustrating an example of a 2:4-scheme flash code when one cell can store three values.

FIG. 7 is a diagram illustrating an example of 2:3-scheme flash codes when one cell can store four values (0, 1, 2, and 3). FIG. 8 is a diagram illustrating an example of 2:4-scheme flash codes when one cell can store three values (0, 1, and 2). FIG. 8 is an example of flash codes called coset codes. Various flash codes can be used without being limited to the examples of FIGS. 7 and 8. In the case of FIG. 8, for example, in the initial state, all three cells have values representing "0", for example, and the states of the three cells change based on information. It is assumed that such a change in the cell state that the value written to a cell changes like "0"→"1"→"2"→"3" is possible without erasure. In this case, when the value "3" written to a cell is to be changed, it is necessary to write "0" first to the cell by erasing. Although multiple values are present as a value to be written to a cell corresponding to each item of information as shown in FIG. 7, in order to increase an expectation value for the number of possible subsequent overwriting times, the writing value is selected based on a method of determining the writing value so that the largest level of the cell is minimized, a method of determining the writing value so that the sum of the cell levels is minimized, and other methods. Although various method of selecting the writing value to be written to a cell are known, in the present embodiment, the method of selecting the writing value to be written to a cell is not particularly limited, and a selecting method generally used in association with flash codes can be used. When rewriting is repeatedly performed, and it becomes impossible to select a writing value for a cell corresponding to the rewritten information without erasure, it is determined that overwriting is not possible, and erasing is performed. Although FIG. 4 illustrates an example in which the value written to a cell decreases as the level increases, and FIGS. 7 and 8 illustrate examples in which the value written to a cell increases as the level increases, an encoding method according to the present embodiment can be applied to any of the above examples.

In the description of the rewriting in FIG. 4, although an example in which "1" is stored in the initial state and is changed to "0" by writing has been described, the value in the initial state is not limited to this. In the case of single-level cells, "0" may be stored in the initial state and is changed to "1" by writing, and erasing may be performed when all cells have "1".

Figure 9:
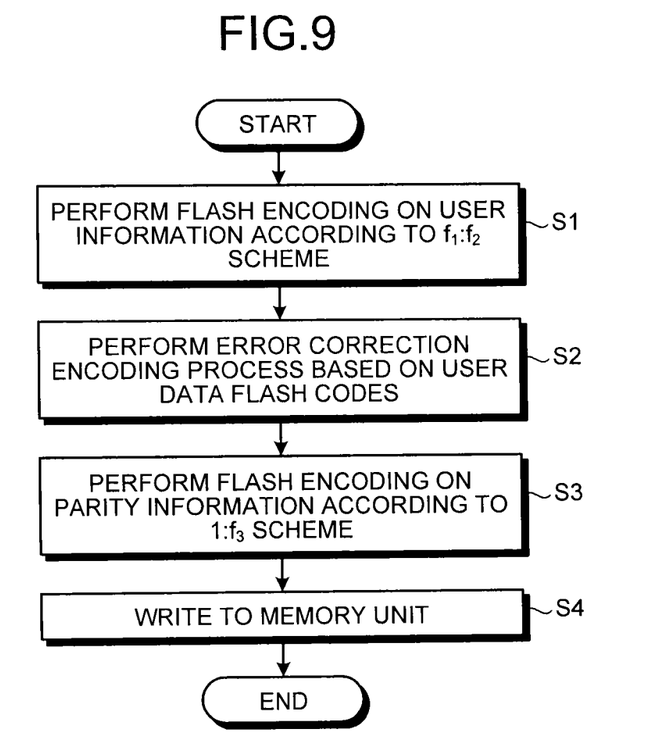
FIG. 9 is a flowchart illustrating an example of the steps of flash encoding during initial writing.

Next, the flow of flash encoding according to the present embodiment will be described. FIG. 9 is a flowchart illustrating an example of the flow of flash encoding during initial writing. First, in the memory controller 2, the flash encoding unit 28 performs flash encoding on user data to be written to the memory unit 3 according to the $f_1$:$f_2$ scheme to generate user data flash codes (step S1).

Subsequently, the error correction encoding unit 25 performs an error correction encoding process based on the user data flash codes to generate parities (step S2). The flash encoding unit 28 performs flash encoding on the parities according to the 1:$f_3$ scheme to generate parity flash codes (step S3). The memory I/F 22 writes the user data flash codes and the parity flash codes to the memory unit 3 (step S4). The location of the memory unit 3 in which the memory I/F 22 writes the user data flash codes and the parity flash codes is managed by the control unit 23, for example. That is, correspondence between a logical address of information and a physical address on the memory unit 3 is managed by the control unit 23, for example, and the memory I/F 22 performs writing based on an instruction from the control unit 23.

Figure 10:
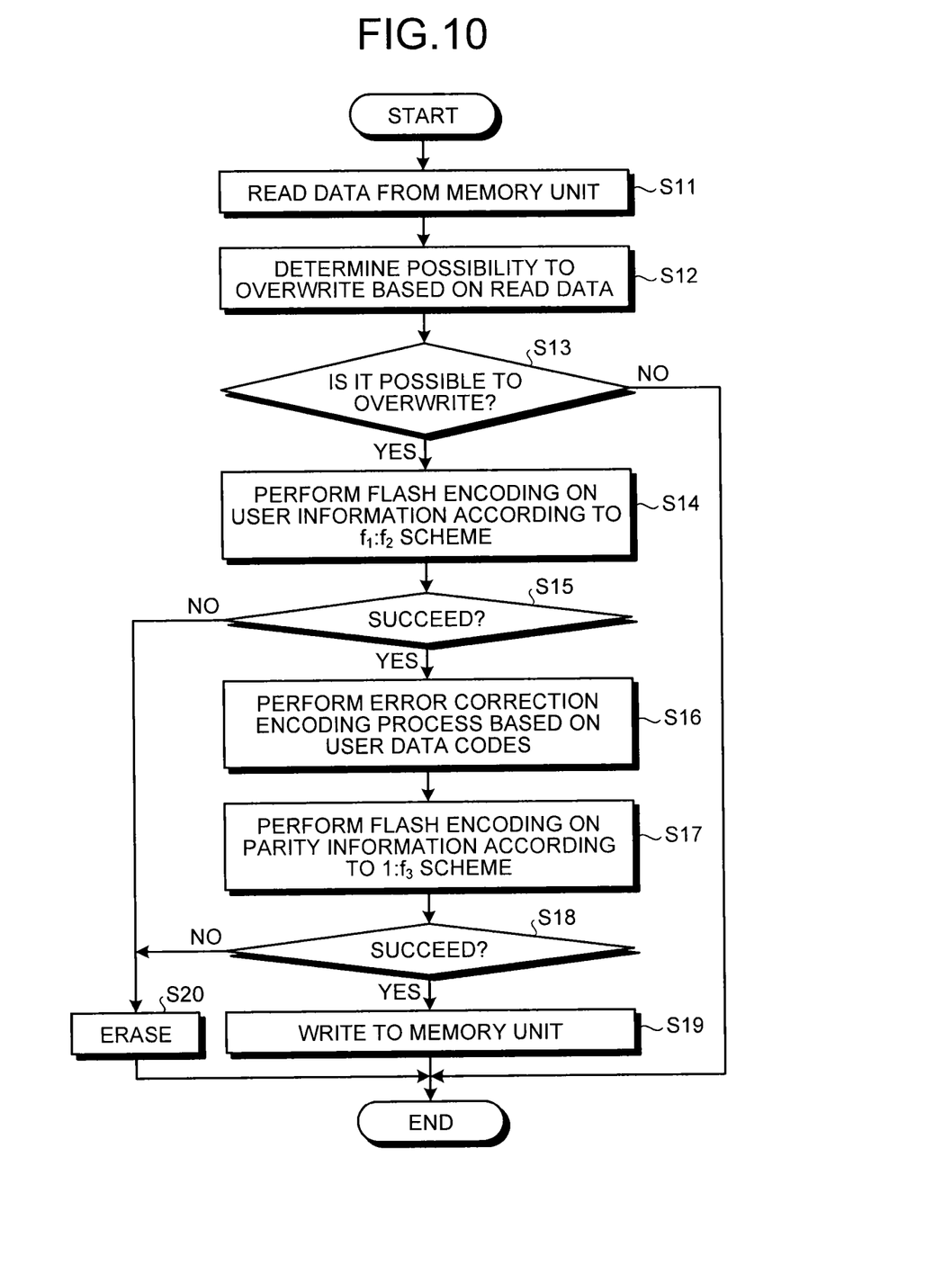
FIG. 10 is a flowchart illustrating an example of the steps of flash encoding during overwriting.

FIG. 10 is a flowchart illustrating an example of the flow of flash encoding during overwriting. FIG. 10 illustrates the flow of flash encoding when information is rewritten to a region of the memory unit 3 where information has been written at least once. First, when information is rewritten, the control unit 23 obtains a physical address on the memory unit 3 in which rewriting target information is written and sends a reading target physical address to the memory I/F 22 to thereby read data (user data flash codes and parity flash codes) from the memory unit 3 (step S11).

The determining unit 30 determines the possibility to overwrite information to user data cells based on the data read from the memory unit 3 (step S12). Specifically, it is determined whether or not it is possible to change the read user data flash codes into user data flash codes corresponding to the information to be rewritten without performing erasing. When overwriting is not possible (No in step S13), the process ends. After that, erasing is performed.

When overwriting is possible (Yes in step S13), the flash encoding unit 28 performs flash encoding on the user data to be written to the memory unit 3 according to the $f_1$:$f_2$ scheme to generate user data flash codes (step S14). When flash encoding in step S14 succeeds (Yes in step S15), the flow proceeds to step S16. When flash encoding fails (No in step S15), the memory I/F 22 erases the data stored in the user data cells and the parity cells (step S20).

In step S16, the error correction encoding unit 25 performs an error correction encoding process based on the user data flash codes to generate parities (step S16). The flash encoding unit 28 performs flash encoding on the parities according to the 1:$f_3$ scheme to generate parity flash codes (step S17). When flash encoding in step S17 succeeds (Yes in step S18), the flow proceeds to step S19. When flash encoding fails (No in step S18), the flow proceeds to step S20.

After step S18, the memory I/F 22 writes user data flash codes and parity flash codes to the memory unit 3 (step S19).

In the flow of FIG. 10, the possibility to overwrite information to user data cells is determined, and when overwriting to the user data cells is possible, flash encoding and error correction encoding are performed on the user data to generate parities, and then, the possibility to rewriting information to the parity cells is determined. However, the processing flow is not limited to this.

Figure 11:
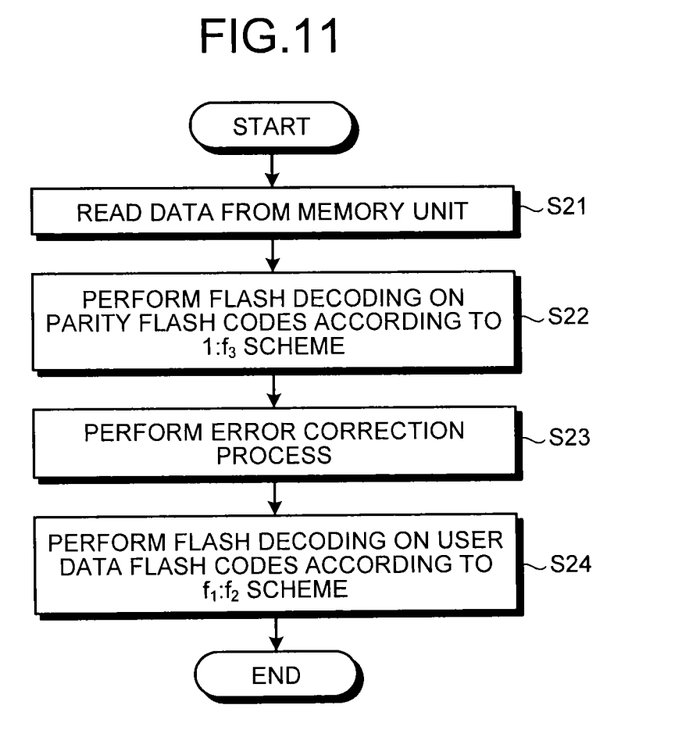
FIG. 11 is a flowchart illustrating an example of the steps of decoding.

FIG. 11 is a flowchart illustrating an example of the flow of decoding according to the present embodiment. When information is read from the memory unit 3, the control unit 23 obtains a physical address on the memory unit 3 in which reading target information is written and sends a reading target physical address to the memory I/F 22 to thereby read data (user data flash codes and parity flash codes) from the memory unit 3 (step S21).

The flash decoding unit 29 performs flash decoding (decoding of flash codes) on the parity flash codes read from the memory unit 3 according to the $1{:}f_3$ scheme (step S22). There is a possibility that flash-decoded parities include errors.

The error correction decoding unit 26 performs an error correction process based on the flash-decoded parities and the user data flash codes read from the memory unit 3 (step S23). By this process, errors in the flash-decoded parities and the user data flash codes read from the memory unit 3 are corrected. The flash decoding unit 29 performs flash decoding on the error-corrected user data flash codes according to the $f_1{:}f_2$ scheme (step S24).

If user data is just subjected to error correction encoding and flash-encoding according to the $f_1{:}f_2$ scheme and is stored in the memory unit 3, an error in one cell may propagate to multiple bits. In contrast, by performing the flash encoding and decoding according to the present embodiment, even when errors are included in the user data flash codes read from the memory unit 3, since flash decoding according to the $f_1{:}f_2$ scheme is performed after errors are corrected, it is possible to prevent propagation of errors.

As described above, in the present embodiment, user data is flash-encoded according to the $f_1{:}f_2$ scheme and stored in the memory unit 3, and the flash-encoded user data is subjected to the error correction encoding process to generate parities. The parities are flash-encoded according to the $1{:}f_3$ scheme and stored in the memory unit 3. Thus, it is possible to prevent an error in one cell from propagating to information without decreasing the volume of information that can be stored in the memory unit 3.

In the present embodiment, although the flash encoding unit 28 has both the function of a first flash encoding unit that performs flash encoding on the user data according to the $f_1{:}f_2$ scheme (first scheme) and the function of a second flash encoding unit that performs flash encoding on parities according to the $1{:}f_3$ scheme (second scheme), the flash encoding unit 28 may include the first flash encoding unit and the second flash encoding unit separately. Similarly, the flash decoding unit 29 may include a first flash decoding unit and a second flash decoding unit separately.

In the present embodiment, although an example in which user data is flash-encoded according to the $f_1{:}f_2$ scheme, and parities are flash-encoded according to the $1{:}f_3$ scheme has been described, the flash encoding schemes for user data and parities are not limited to this. The flash encoding schemes for user data and parities may be selected so that the number of information bits in relation to the number of cells is higher for user data than parities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller that controls a nonvolatile memory, comprising:
   a first flash encoding unit that performs flash encoding on user data according to a first scheme to generate user data flash codes;
   an encoding unit that performs an error correction encoding process on the user data flash codes to generate parities;
   a second flash encoding unit that performs flash encoding on the parities according to a second scheme different from the first scheme to generate parity flash codes; and
   a memory interface that writes the user data flash codes and the parity flash codes to the nonvolatile memory.

2. The memory controller according to claim 1, further comprising:
   a first flash decoding unit that decodes parity data from the parity flash codes read from the nonvolatile memory;
   a decoding unit that performs an error correction process on the parity data and the user data flash codes read from the nonvolatile memory; and
   a second flash decoding unit that decodes user data from the error-corrected user data flash codes.

3. The memory controller according to claim 1, wherein the first scheme is a $f_1{:}f_2$ scheme that expresses $f_1$ bits of data using $f_2$ cells, and the second scheme is a $1{:}f_3$ scheme that expresses one bit of data using $f_3$ cells, where $f_1$, $f_2$, and $f_3$ are integers of 2 or more.

4. A storage device comprising:
   a nonvolatile memory;
   a first flash encoding unit that performs flash encoding on user data according to a first scheme to generate user data flash codes;
   an encoding unit that performs an error correction encoding process on the user data flash codes to generate parities;
   a second flash encoding unit that performs flash encoding on the parities according to a second scheme different from the first scheme to generate parity flash codes; and
   a memory interface that writes the user data flash codes and the parity flash codes to the nonvolatile memory.

5. The storage device according to claim 4, further comprising:
   a first flash decoding unit that decodes parity data from the parity flash codes read from the nonvolatile memory;
   a decoding unit that performs an error correction process on the parity data and the user data flash codes read from the nonvolatile memory; and
   a second flash decoding unit that decodes user data from the error-corrected user data flash codes.

6. The storage device according to claim 4, wherein the first scheme is a $f_1{:}f_2$ scheme that expresses $f_1$ bits of data using $f_2$ cells, and the second scheme is a $1{:}f_3$ scheme that expresses one bit of data using $f_3$ cells, where $f_1$, $f_2$, and $f_3$ are integers of 2 or more.

7. A memory control method for controlling a nonvolatile memory, comprising:
 performing flash encoding on user data according to a first scheme to generate user data flash codes;
 performing an error correction encoding process on the user data flash codes to generate parities;
 performing flash encoding on the parities according to a second scheme different from the first scheme to generate parity flash codes; and
 writing the user data flash codes and the parity flash codes to the nonvolatile memory.

8. The memory control method according to claim 7, further comprising:
 decoding parity data from the parity flash codes read from the nonvolatile memory;
 performing an error correction process on the parity data and the user data flash codes read from the nonvolatile memory; and
 decoding user data from the error-corrected user data flash codes.

9. The memory control method according to claim 7, wherein
 the first scheme is a $f_1:f_2$ scheme that expresses $f_1$ bits of data using $f_2$ cells, and the second scheme is a $1:f_3$ scheme that expresses one bit of data using $f_3$ cells, where $f_1$, $f_2$, and $f_3$ are integers of 2 or more.

* * * * *